US009338295B2

(12) United States Patent
Blanchard et al.

(10) Patent No.: US 9,338,295 B2
(45) Date of Patent: May 10, 2016

(54) DYNAMIC MODIFICATION OF AUTOMATED COMMUNICATION SYSTEMS (71) Applicant: AT&T INTELLECTUAL PROPERTY I, L.P., Atlanta, GA (US)

(72) Inventors: Harry E. Blanchard, Rumson, NJ (US); Gregory Pulz, Cranbury, NJ (US); Lan Zhang, Malvern, PA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 70 days.

(21) Appl. No.: 14/039,234

(22) Filed: Sep. 27, 2013

(65) Prior Publication Data

US 2015/0092929 A1 Apr. 2, 2015

(51) Int. Cl.
*H04M 1/64* (2006.01)
*H04M 3/493* (2006.01)
*G10L 15/22* (2006.01)

(52) U.S. Cl.
CPC .............. *H04M 3/4936* (2013.01); *G10L 15/22* (2013.01); *H04M 2203/355* (2013.01); *H04M 2203/556* (2013.01)

(58) Field of Classification Search
CPC ............ H04M 2201/60; H04M 3/5307; H04L 12/5835
USPC ............................ 379/88.14, 265.07; 704/257
See application file for complete search history.

(56) References Cited

U.S. PATENT DOCUMENTS

| | | | |
|---|---|---|---|
| 7,386,103 B1 | 6/2008 | Chahal | |
| 7,813,485 B2 | 10/2010 | Yin et al. | |
| 7,961,856 B2 | 6/2011 | Zellner | |
| 8,050,392 B2 | 11/2011 | Adams et al. | |
| 8,064,573 B2 | 11/2011 | Clelland et al. | |
| 8,085,927 B2 | 12/2011 | Erhart et al. | |
| 8,136,026 B2 | 3/2012 | Commarford et al. | |
| 8,150,020 B1 | 4/2012 | Blanchard et al. | |
| 8,374,317 B2 | 2/2013 | Jaiswal et al. | |
| 8,406,401 B2 | 3/2013 | Casas | |
| 8,457,288 B2 | 6/2013 | Tischer et al. | |
| 8,488,771 B2 | 7/2013 | Blanchard et al. | |
| 8,494,122 B2 | 7/2013 | Jaiswal et al. | |
| 8,527,277 B2* | 9/2013 | Bushey et al. | 704/270.1 |
| 8,649,505 B2* | 2/2014 | Michaelis | H04M 1/2474 379/422 |
| 2003/0191648 A1* | 10/2003 | Knott | G10L 15/22 704/275 |
| 2006/0074671 A1* | 4/2006 | Farmaner | G10L 15/193 704/257 |

(Continued)

FOREIGN PATENT DOCUMENTS

| | | |
|---|---|---|
| EP | 0973314 | 1/2000 |
| EP | 1860862 | 11/2007 |

(Continued)

*Primary Examiner* — Van D Huynh (74) *Attorney, Agent, or Firm* — Greenblum & Bernstein, P.L.C.

(57) ABSTRACT

A script for an interactive communication is dynamically adjusted during the interactive communication. The interactive communication is monitored over a communication network using a computer with a processor and memory for input during the interactive communication. Input incompatible with a script for the interactive communication is detected for the interactive communication. The incompatible input is categorized. The script is dynamically adjusted during the interactive communication into a dynamically updated script in accordance with the categorizing. Information is provided over the communication network to the initiator in accordance with the dynamically updated script.

20 Claims, 9 Drawing Sheets (56) References Cited

U.S. PATENT DOCUMENTS

2012/0095861 A1  4/2012  Feng et al.
2013/0136247 A1  5/2013  Stine et al.
2013/0156165 A1  6/2013  Springer

FOREIGN PATENT DOCUMENTS

JP   2005-292476   10/2005
WO   2008/095021   8/2008

* cited by examiner

DYNAMIC MODIFICATION OF AUTOMATED COMMUNICATION SYSTEMS

BACKGROUND

1. Field of the Disclosure

The present disclosure relates to communication services. More particularly, the present disclosure relates to dynamically modifying automated interactive communication services.

2. Background Information

Interactive voice response (IVR) systems provide communication services to users. A variety of problems are encountered by interactive voice response systems, including, e.g.:
- user accents
- environmental noise
- user input entry errors
- users not understanding instructions
- problems with user devices
- problems with communication networks
- users terminating communications before the communication services are complete

DETAILED DESCRIPTION

In view of the foregoing, the present disclosure, through one or more of its various aspects, embodiments and/or specific features or sub-components, is thus intended to bring out one or more of the advantages as specifically noted below.

Input to an interactive communication as described herein is audible information or silence received or detected over a communication network and sensed by an interactive system. Input may include perceived or actual silence or any equivalent, and audible information of any form both expected by and unexpected by, and both understandable by and incoherent to, the interactive system. The received audible information may be speech or other forms of audible information provided to recognition technology such as speech recognition technology in the interactive system. The received audible information may also be touch-tone/dual-tone multi-frequency (DTMF) information that can be recognized and processed by the interactive system. As described herein, prompts presented by the interactive system and input solicited by the interactive system may both be dynamically adjusted to accommodate different users based on input. Prompts and information are presented by a default script, and the default script is itself dynamically adjusted when prompts and information are changed outside of the normal interactive process that occurs using the default script. That is, the dynamic adjustment described herein is not a part of the flow that occurs normally in the script when users select from an assortment of choices. The dynamic adjustment may occur, for example, when speech recognition technology does not appear to be working during an interactive communication.

As an initial example, an interactive system may switch from soliciting speech input from a user to soliciting touch-tone input from the user when the interactive system senses that the user is having trouble providing speech input. As another example, an interactive system may replace one or more prompts when the interactive system senses that the user misunderstands instructions and is having trouble entering correct information into the interactive system. Therefore, the interactive systems described herein customize interaction with users on a case-by-case basis.

Scripts as the term is used herein are analogous to roadmaps for an interactive system to use in providing interactive communication services. A particular script to use may be determined based on the communication address (e.g., phone number or email address) contacted by the user, and may be standardized as a default script for users who contact the communication address. The script begins with initial information and/or prompts to provide to a user. The user responds to prompts, and subsequently a set of information and/or prompts is selected to present to the user based on the input of the user such as a response to a previous prompt. Thus, different users may be presented with different sets of prompts and different information at each sequential stage of a communication session though the different users contact the same communication address. The differences between communication sessions are the result of the input provided by the user. Though the default scripts have different alternative sets of prompts and information to provide, the alternative sets are not endless, and in some instances as described herein the interactive systems do not receive proper input that allows the communication session to progress. The absence of proper input that would allow the script to progress as described herein is referred to as improper input, erroneous input, incompatible input, or similar terminology.

Figure 1:
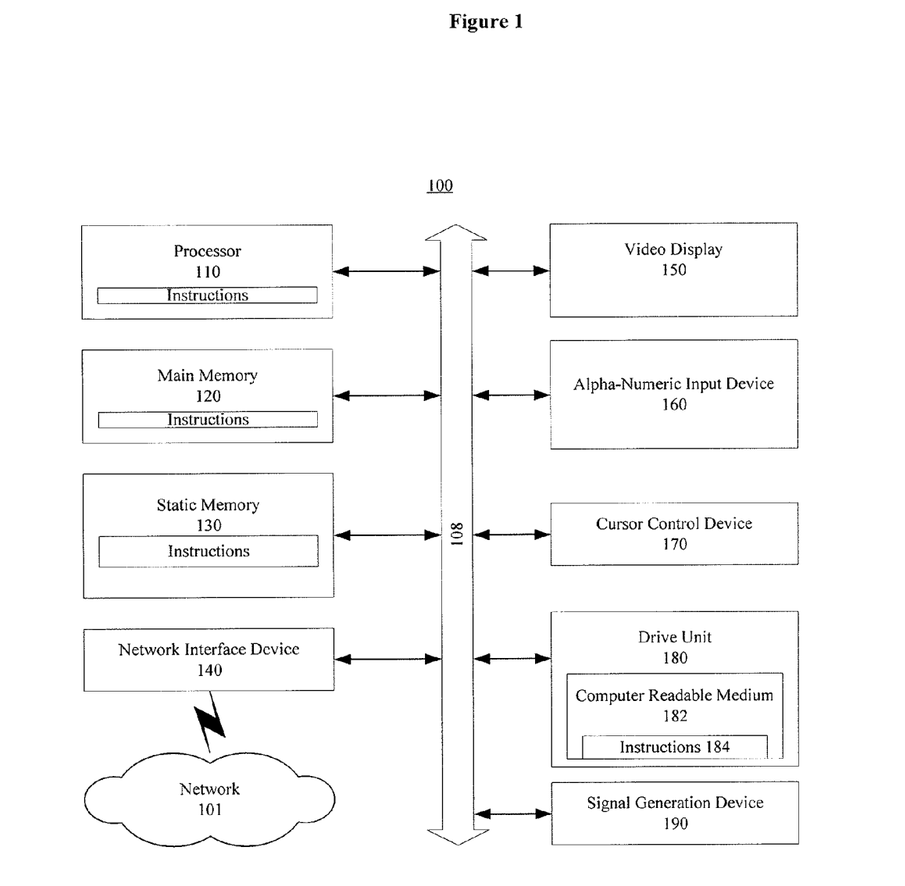
FIG. 1 shows an exemplary general computer system that includes a set of instructions for dynamic modification of automated communication systems, according to an aspect of the present disclosure.

FIG. 1 is an illustrative embodiment of a general computer system, on which a method of dynamic modification of automated communication systems can be implemented, and which is shown and is designated 100. The computer system 100 can include a set of instructions that can be executed to cause the computer system 100 to perform any one or more of the methods or computer based functions disclosed herein. The computer system 100 may operate as a standalone device or may be connected, for example, using a network 101, to other computer systems or peripheral devices.

In a networked deployment, the computer system may operate in the capacity of a server computer or as a client user computer in a server-client user network environment, or as a peer computer system in a peer-to-peer (or distributed) network environment. The computer system 100 can also be implemented as or incorporated into various devices, such as a personal computer (PC), a desktop computer, a laptop computer, a server computer, a client computer, a peer computer, a tablet personal computer (PC), a personal digital assistant (PDA), a mobile device, a palmtop computer, a communication device, a wireless telephone, a personal trusted device, a web appliance, an interactive system computer, an interactive response system, a user computer, a user device, a user smart phone, or any other machine capable of executing a set of instructions (sequential or otherwise) that specify actions to be taken by that machine. In a particular embodiment, the computer system 100 can be implemented using electronic devices that provide voice, video and/or data communication. Further, while a single computer system 100 is illustrated, the term "system" shall also be taken to include any collection of systems or sub-systems that individually or jointly execute a set, or multiple sets, of instructions to perform one or more computer functions as described herein.

As illustrated in FIG. 1, the computer system 100 may include a processor 110, for example, a central processing unit (CPU), a graphics processing unit (GPU), or both. Moreover, the computer system 100 can include a main memory 120 and a static memory 130 that can communicate with each other via a bus 108. As shown, the computer system 100 may further include a video display unit 150, such as a liquid crystal display (LCD), an organic light emitting diode (OLED), a solid state display, or a cathode ray tube (CRT). Additionally, the computer system 100 may include an input device 160, such as a keyboard/virtual keyboard or touch-sensitive input screen, and a cursor control device 170, such as a mouse or touch-sensitive input screen or pad. The computer system 100 can also include a disk drive unit 180, a signal generation device 190, such as a speaker or remote control, and a network interface device 140.

In a particular embodiment, as depicted in FIG. 1, the disk drive unit 180 may include a computer-readable medium 182 in which one or more sets of instructions 184, e.g. software, can be embedded. A computer-readable medium 182 is a tangible article of manufacture, from which sets of instructions 184 can be read. Further, the instructions 184 may embody one or more of the methods or logic as described herein. In a particular embodiment, the instructions 184 may reside completely, or at least partially, within the main memory 120, the static memory 130, and/or within the processor 110 during execution by the computer system 100. The main memory 120, the static memory 130, and the processor 110 also may be or may include computer-readable media that are tangible and non-transitory during the time instructions 184 are stored therein. As used herein, the term "non-transitory" is meant only to be interpreted by one of ordinary skill in the art with common sense, and not as an eternal characteristic of something that would last beyond the universe. The term "non-transitory" specifically does not encompass fleeting characteristics such as characteristics of a particular carrier wave or signal or other forms that exist only briefly in any place.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations. Nothing in the present application should be interpreted as being implemented or implementable solely with software and not hardware such as a tangible processor and tangible memory.

In accordance with various embodiments of the present disclosure, the methods described herein may be implemented using a hardware computer system that executes software programs. The software programs include executable instructions executed by tangible processors as described herein. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium 182 that includes instructions 184 or receives and executes instructions 184 responsive to a propagated signal; so that a device connected to a network 101 can communicate voice, video or data over the network 101. Further, the instructions 184 may be transmitted or received over the network 101 via the network interface device 140. The computer-readable medium 182 or any other computer-readable medium contemplated herein may be a tangible machine or article of manufacture that is tangible and non-transitory for a period of time during which instructions and/or data are stored therein or thereon.

Figure 2:
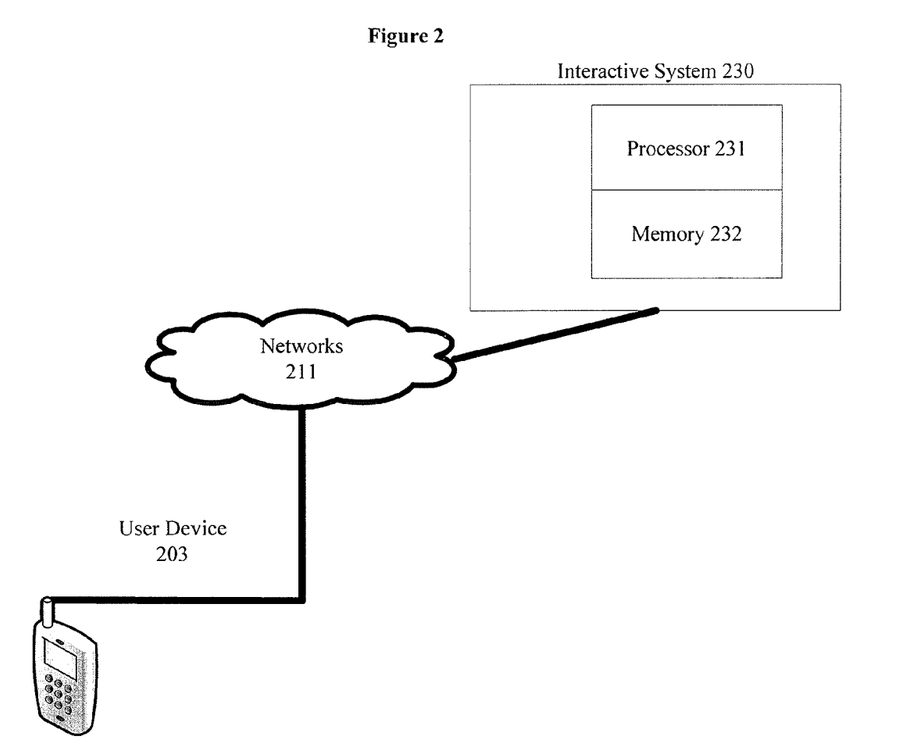
FIG. 2 shows an exemplary network for dynamic modification of automated communication systems, according to an aspect of the present disclosure.

FIG. 2 shows an exemplary network that includes an interactive system 230 to provide a communication service to a user using user device 203, according to an aspect of the present disclosure. In FIG. 2, user device 203 communicates across networks 211 with interactive system 230. The interactive system 230 includes a computer such as the general computer system 100 shown in FIG. 1, and includes processor 231 and memory 232 consistent with the descriptions of processors and memory described for FIG. 1. The interactive system 230 may be an interactive voice response system computer for voice calls or a web server for interactive internet sites that receive audible input. The networks 211 may be any combination of wired, wireless, voice, data, packet-switched and circuit-switched networks, so long as the networks 211 can carry communications from user device 203 to the interactive system 230. The memory 232 stores instructions executed by the processor 231, so that the interactive system 230 interacts with a party using the user device 203. The memory 232 may store a script of instructions that vary based on input from the party using the user device 203. A script is followed to iteratively present options to the party, and then subsequent options based on selections of previous options. The script may also present information before, between, or after presenting options.

Networks 211 and other networks described herein may include different networks used differently to carry voice and data. For example, networks 211 may include a code division multiple access (CDMA) network as well as a separate second network to communicate using voice and data simultaneously or otherwise in cooperation. Separate CDMA and LTE networks may be used for voice and data communications. Alternatively, a CDMA network may be used for voice communications and a WiFi network for data communications. As yet another alternative, an LTE network may be used for wide area network voice and data communications and a WiFi network for local area network data communications.

Whereas in FIG. 2 an interactive system 230 may be an automated computer agent that provides all or part of a communication service, the interactive system 230 may also be provided together with other devices and systems used by human agents to provide part of a communication service. In the embodiment of FIG. 2, the interactive system 230 may provide coordinated services with agents. For example, the interactive system 230 may be an interactive voice response system that initially receives and processes calls before identifying and transferring the calls to an appropriate agent.

In the embodiment of FIG. 2, communications such as telephone calls to the interactive system 230 are monitored. When the interactive system 230 recognizes that the party interacting with the interactive system 230 is having a problem, the interactive system 230 identifies the nature of the problem. The interactive system 230 then dynamically modifies the script used for the interaction based on the identified problem so as to enable further advances in the script. Problems may include incompatible input, erroneous input such as silence, non-responsive input, unrecognizable input, or other input that does not allow an interactive system 230 to advance through a default script. The interactive system 230 may also time-out when no input or no expected input is received in a predetermined time period after a prompt is played. Problems addressed by the disclosure herein include input that is incompatible with a default script such that an interactive system 230 cannot move forward through the script in a communication session. Thus, when an interactive system cannot proceed forward through a script in a communication session, an analysis of the interaction and input is performed to determine whether and how the script can be modified dynamically in order to allow the communication session to proceed.

Of course, an inability to move forward through a script is not an absolute necessity in the disclosure herein, as some detected errors may be more of an inconvenience than a fatal error in the interactive session. For example, errors that lead merely to inefficient use of time such as requiring input and confirmation of the input may merely result in changes to the script to request that the user enter input in a manner that does not require confirmation. For example, a user may be instructed to enter input only by keypad entry such as touch-tone/DTMF entry.

The interactive system 230 may include speech recognition technology, such as a program executed by the processor 231 to analyze and recognize input speech and determine whether the input speech matches one of a number of potential responses expected from a party using the user device 203. For example, speech recognition may be used in the interactive system 230 to determine if a party speaks the words "yes" or "no" or other recognizable and expected terms indicating an affirmative or negative answer. Similarly, speech recognition may be used in the interactive system 230 to determine if a party speaks any number that matches an expected numerical input.

Of course, speech recognition may also be free-form so that an interactive system 230 is not attempting to match speech to a very small set of particular expected responses. For example, speech recognition technology may accept free-form input, identify the input, and then search for meanings similar to the input that are acceptable as a response to the interactive system, so that the interactive system 230 can present the acceptable input to the user to confirm the free-form input. Speech recognition may be used by any interactive system described for any embodiment herein unless otherwise specifically described as being inconsistent with the embodiment.

Figure 3:
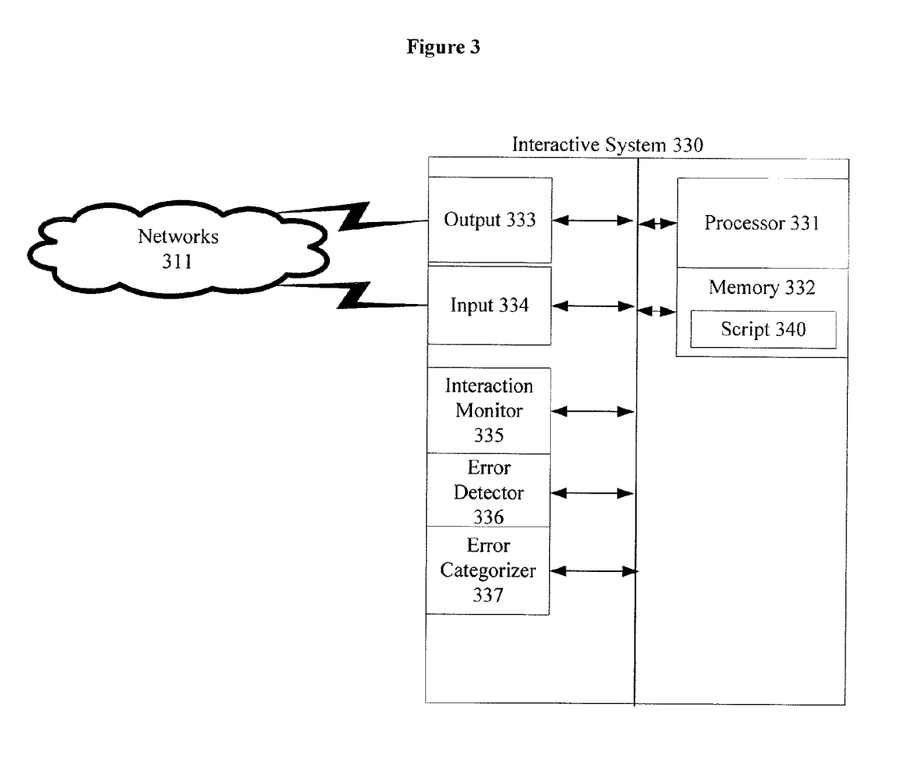
FIG. 3 shows an exemplary interactive system for dynamic modification of automated communication systems, according to an aspect of the present disclosure.

FIG. 3 shows an exemplary interactive system for dynamic modification of automated communication systems, according to an aspect of the present disclosure. In FIG. 3, interactive system 330 includes an output 333 and input 334 for respectively sending and receiving communications with a party in an interactive communication. The output 333 may include a transmitter and the input 334 may include a receiver. The output 333 and input 334 may also include a microphone and a speaker, respectively. The output 333 plays announcements and instructions to the party in accordance with a script 340, and the input 334 receives input from the party. The input received by input 334 may be audible input that is converted to digital form. The interactive system 330 also includes a processor 331 and a memory 332 that processes the script 340 in accordance with the interaction in the communication. Interaction monitor 335 monitors the interactive communication for input during the interactive communication. Error detector 336 detects communication errors in the interaction communication. Errors include input incompatible with the script 340. The incompatible input is not useful in advancing the script, and may include silence, noise, voice or tone data that is not an expected potential response to a prompt, unrecognizable speech, and other forms of input that are not accepted by the interactive system 330 to advance through the script 340 in the interactive communication. Error categorizer 337 categorizes the errors detected by the error detector 336. The script 340 is then dynamically adjusted during the interactive communication into a dynamically updated script. The adjustment is performed based on, for example, the categorization of the errors. The remainder of the interactive communication is in accordance with the dynamically updated script insofar as the dynamically updated script differs from the original script.

The interaction monitor 335, error detector 336 and error categorizer 337 may be entirely software instructions, or may each or combined be a combination of software instructions and hardware that executes the software instructions. That is, interaction monitor 335, error detector 336 and error categorizer 337 may be individual modules independent of the processor 331 and memory 332, and may be provided as an update to or modification of an existing interactive system 330, including one or more additional processors and instructions executed by the additional processors. These and other elements described herein therefore may be sold or otherwise provided independent of the interactive system 330, and installed to or made otherwise compatible with the interactive system 330.

An example of how the interactive system 330 in FIG. 3 would be used is by a financial institution. The financial institution may provide the interactive system 330 as an interactive voice response system that interacts with users calling a telephone number. The financial institution may provide a script for the interactive system 330 so that users can check balances, transfer money, ask to speak to a representative, and so on. When errors and other forms of incompatible input are received and detected as described herein, the interactive system 330 may use the input to categorize the errors or other forms of incompatible input, and then modify the default script. The modifications may include specifying to the user that only a particular form of input should be provided, or modifying language or speech characteristics of prompts. Other forms of modifications as described herein may also be provided dynamically to the script while the user is still interacting with the interactive system 330.

Figure 4:
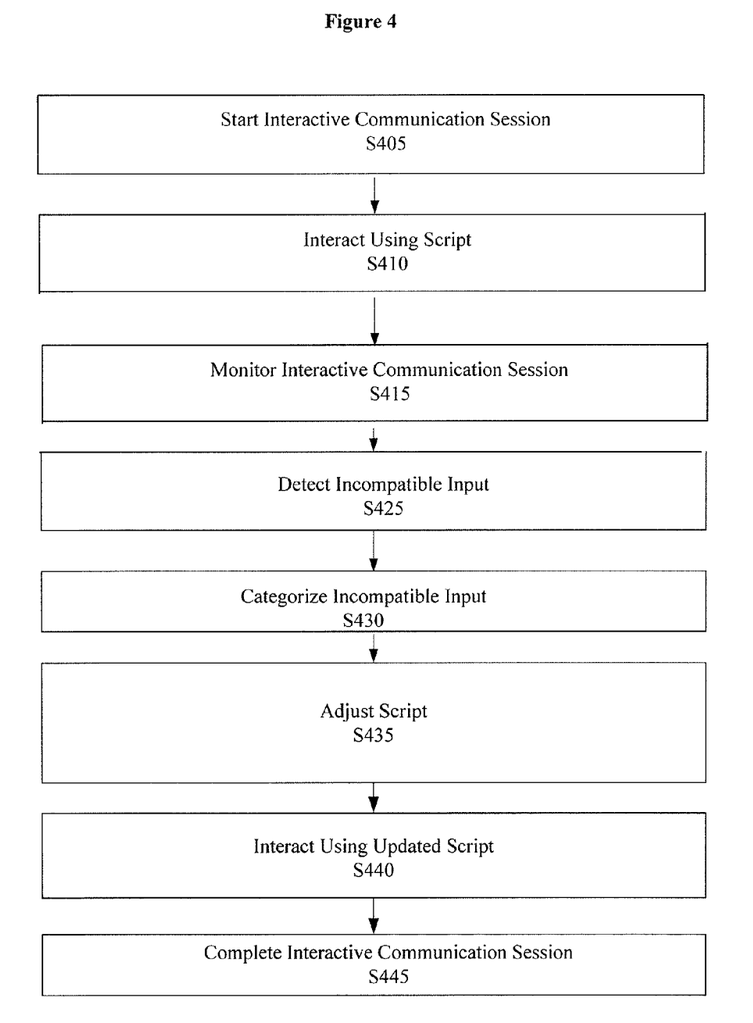
FIG. 4 shows an exemplary process for dynamic modification of automated communication systems, according to an aspect of the present disclosure.

FIG. 4 shows an exemplary process for dynamic modification of automated communication systems, according to an aspect of the present disclosure. In FIG. 4, an interactive communication session starts at S405. During the interactive communication session, interaction according to a script occurs at S410. While the process of FIG. 4 is shown as a linear process, the interaction occurs simultaneous in whole or in part with other steps of the process shown in FIG. 4. At S415, the interactive communication session is monitored. At S425, incompatible input is detected. As noted herein, incompatible input is input that may not allow the original default script to progress, such as silence or unintelligible voice instructions. Alternatively, incompatible input may be input that merely impedes efficient progress through the default script, such as garbled speech. At S430, the incompatible input is categorized. At S435, the script is adjusted. At S440, adjusted (updated) script is used to interact with the party. At S445, the interactive communication session is completed.

Figure 5:
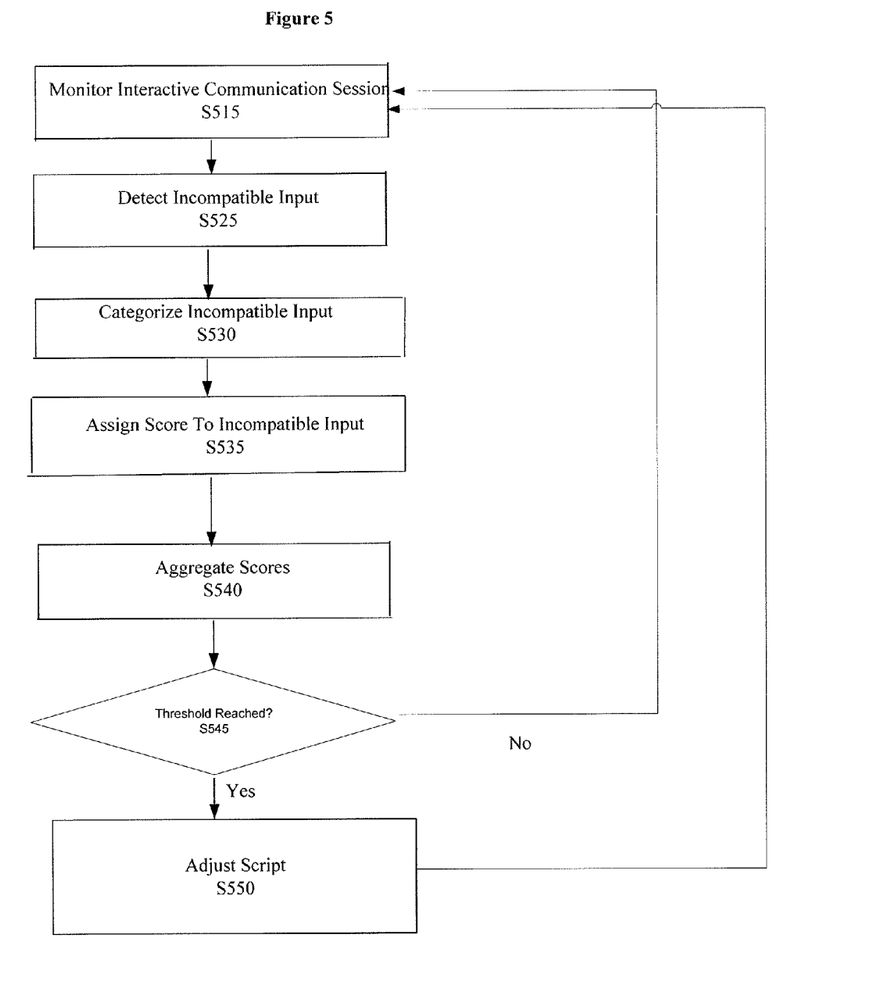
FIG. 5 shows another exemplary process for dynamic modification of automated communication systems, according to an aspect of the present disclosure.

FIG. 5 shows another exemplary process for dynamic modification of automated communication systems, according to an aspect of the present disclosure. In FIG. 5, an interactive communication session is monitored at S515. Incompatible input is detected at S525, and categorized at S530. A score is assigned to the incompatible input at S535. At S540, the assigned score is aggregated with any previously assigned scores. At S545, a determination is made as to whether the aggregated score has reached a threshold. If the threshold is not reached (S545: No), then the process returns to S515 and the interactive communication session is monitored. If a threshold is reached at S545 (S545: Yes), the script is adjusted at S550 and then the process returns to S515 and the interactive communication session is monitored.

Thus, in FIG. 5, an individual instance of incompatible input does not necessarily result in a script adjustment, whereas the script is adjusted once a threshold is reached. The threshold may be reached when numerous instances of minor errors occur, or when a single relatively serious error occurs.

Figure 6:
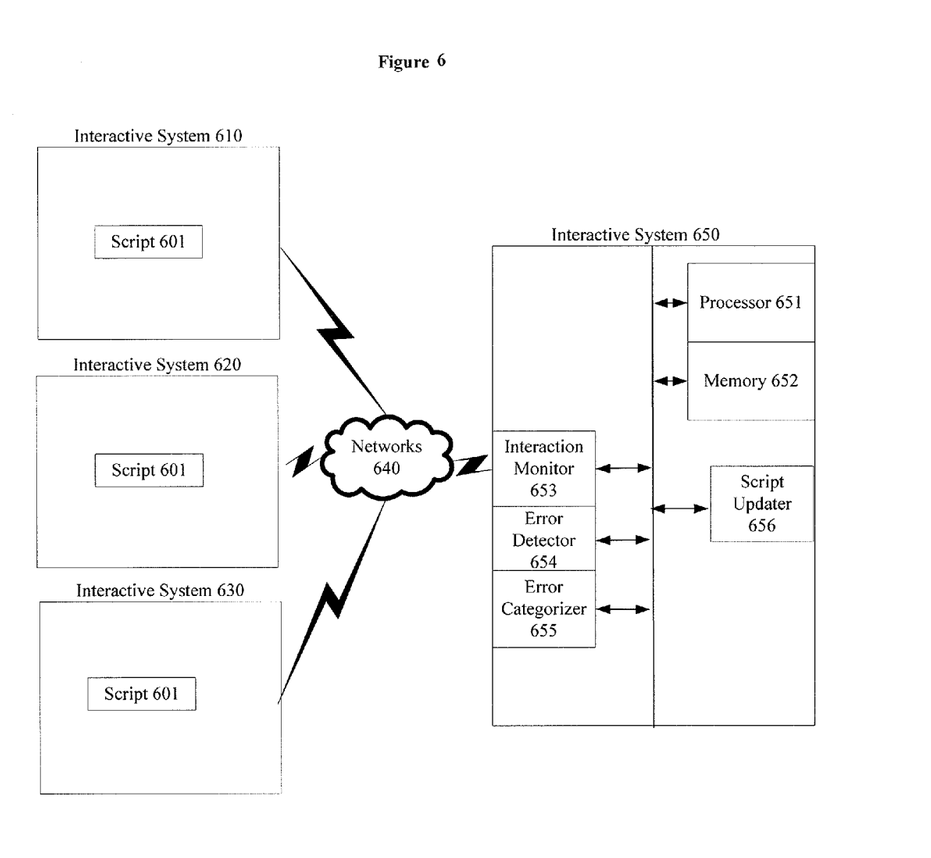
FIG. 6 shows another exemplary network for dynamic modification of automated communication systems, according to an aspect of the present disclosure.

FIG. 6 shows another exemplary network for dynamic modification of automated communication systems, according to an aspect of the present disclosure. In FIG. 6, interactive system 650 provides the modification services on behalf of interactive system 610, interactive system 620 and interactive system 630. Thus, interactive systems 610, 620 and 630 each store and execute a script 601 in order to provide interactive services to users. Interactive system 650 includes an interaction monitor 653, an error detector 654 and an error categorizer. The interactive system 650 may monitor the interactive systems 610, 620, and 630 in real-time and detect errors independently, or may monitor the interactive systems 610, 620, and 630 and receive notifications of errors from interactive systems 610, 620, and 630.

The interactive system 650 is shown to have a processor 651 and memory 652, and though not shown each of the interactive systems 610, 620, and 630 also may have a processor and memory. The interactive system 650 communicates with interactive systems 610, 620, and 630 across networks 640.

Interactive system 650 has an error detector 654 and error categorizer 655 to detect and categorize errors that occur during interactions between interactive systems 610, 620, 630 and parties interacting with interactive systems 610, 620, 630. Interactive system 650 also has a script updater 656 and updates scripts based on error categorizations made by error categorizers 655. The script updater 656 is used to determine when and how to modify scripts 601.

Scripts 601 on interactive systems 610, 620, and 630 may be identical scripts distributed across a distributed network of interactive systems, or may be similar scripts with similar interactions. In either case, the scripts 601 are updated by the script updater 656 in order to advance interactions through the scripts 601 when incompatible input otherwise impedes progress through the scripts. Of course, input such as premature terminations of communications can also be detected and categorized, though it is already then too late to modify the scripts for the terminated communications.

In an example, the systems shown in FIG. 6 are test systems that test scripts 601 before they are fully implemented, so that functional errors and common problems can be identified and corrected before the scripts 601 are used publicly. In another example, the systems shown in FIG. 6 are similar or identical systems used widely for a common purpose such as voicemail.

Another example of how interactive system 650 may be used is a large company with multiple interactive systems 610, 620, 630 that provide identical or similar scripts, such as when interactive voice response systems are distributed in different geographic locations. The interactive system 650 could monitor each of the distributed interactive systems 610, 620, 630 either for all communications, for selected communications, or upon request or notification from the interactive systems 610, 620, 630 such as when the interactive systems 610, 620, 630 detect incompatible input. When the interactive system 650 identifies, categorizes and scores errors as described herein, the interactive system 650 can instruct interactive systems 610, 620, 630 how to modify the scripts they are using. Alternatively, the interactive system 650 may provide a modified script.

An example of an instruction from interactive system 650 includes providing one or more prompts or a sub-dialog of a prompt and several potential secondary prompts that vary based on user input responsive to the first prompt. These prompts from interactive system 650 may be entirely different than any prompts in the default scripts executed by interactive systems 610, 620, 630. Of course, the modifications to the scripts with entirely different prompts not in the original default scripts may also be implemented by the stand-alone interactive systems such as those shown in FIGS. 2 and 3.

Additionally, a sub-dialog of one or more related prompts may be provided as a stand-alone insertion to a variety of scripts, such as when a specific problem is identified as likely occurring. A sub-dialog may be, for example, a set of prompts in a different language than the original default script. A sub-dialog may also be, for example, a set of prompts that ask a specific question or set of questions that are not otherwise asked in the default original script. When a monitored interactive session is identified as possibly having the unusual problem corresponding to the sub-dialog, the default script for the interactive session may be temporarily halted while the sub-dialog is played in order to determine whether unusual problem is occurring. Unusual problems encountered during a default script may include unexpected languages, speech impediments, hearing impediments, or other diagnosable problems that are rare and do not warrant inclusion in the default scripts. As noted, when such an unusual diagnosable problem occurs, a sub-dialog may be provided and played while the default script is temporarily halted.

Figure 7:
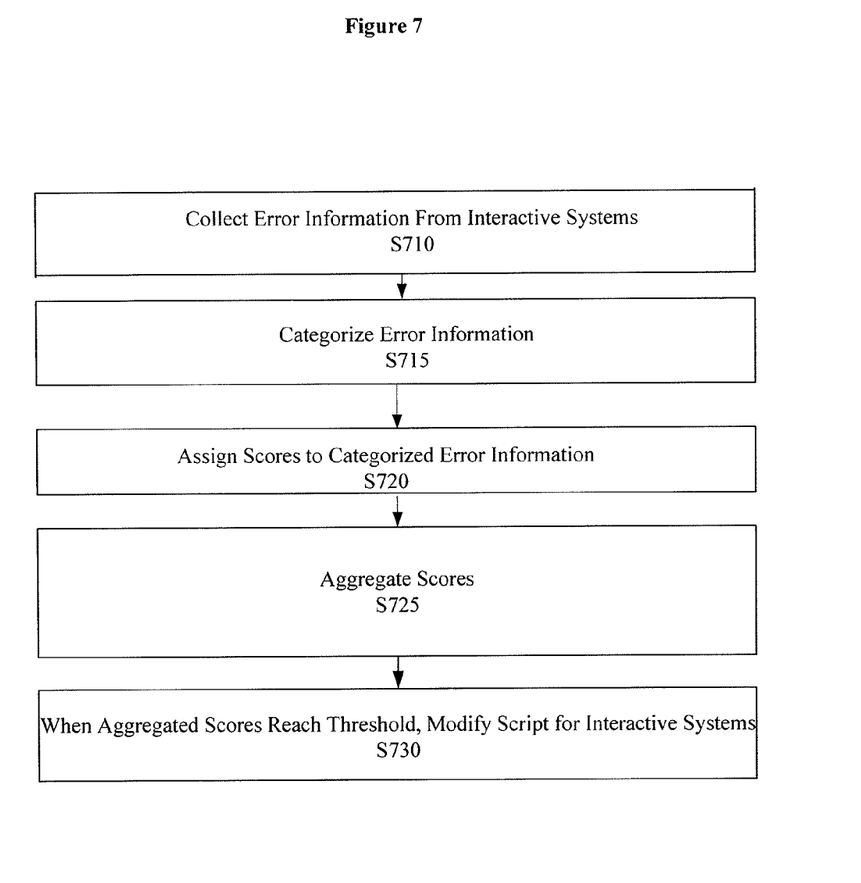
FIG. 7 shows another exemplary process for dynamic modification of automated communication systems, according to an aspect of the present disclosure.

FIG. 7 shows another exemplary process for dynamic modification of automated communication systems, according to an aspect of the present disclosure. In FIG. 7, error information is collected from interactive systems at S710. The error information is categorized at S715. Scores are assigned to the error information at S720. Scores are aggregated at S725. When aggregated scores reach a threshold, scripts are modified for the interactive systems at S730.

In the embodiment of FIG. 7, error information may be collected from numerous interactive systems and from numerous communications before any script is modified. For example, similar errors may be noted for identical scripts, or similar portions of different scripts, before the scripts are modified. The similar errors may occur with different interactive systems and/or in communications with different parties, and may be collectively used by a centralized interactive system such as interactive system 650 to identify when and how to update scripts executed by other interactive systems 610, 620, 630.

Figure 8:
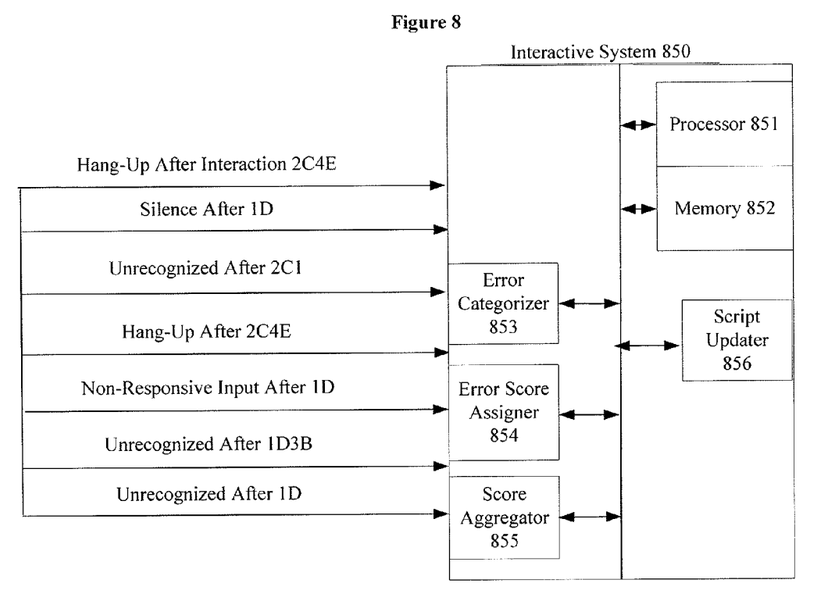
FIG. 8 shows another exemplary interactive system for dynamic modification of automated communication systems, according to an aspect of the present disclosure.

FIG. 8 shows another exemplary interactive system for dynamic modification of automated communication systems, according to an aspect of the present disclosure. As shown in FIG. 8, an interactive system 850 receives a variety of error information from interactive communications. The interactive system 850 includes processor 851 and memory 852, so as to store and execute software routine to categorize the errors, assign scores to the errors, and to aggregate the assigned scores. A script updater 856 updates scripts when warranted by the aggregated scores. As shown in FIG. 8, error categorizer 853 categorizes the errors, error score assigner 854 assigns scores to the errors, and score aggregator 855 aggregates the scores.

Figure 9:
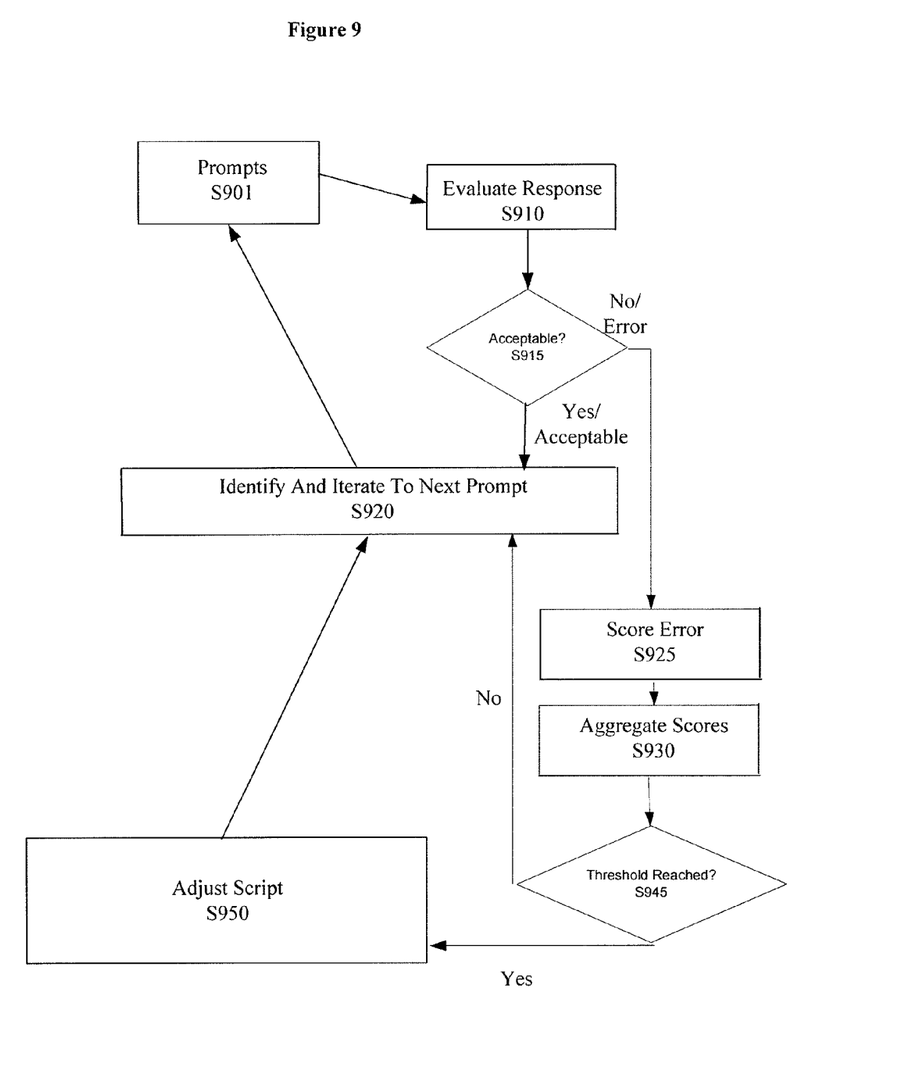
FIG. 9 shows another exemplary process for dynamic modification of automated communication systems, according to an aspect of the present disclosure.

FIG. 9 shows another exemplary process for dynamic modification of automated communication systems, according to an aspect of the present disclosure. In the process shown in FIG. 9, prompts S901 are played iteratively. After each prompt S901, a response to the prompt S901 is evaluated at S910. If the response to the prompt S901 is determined to be acceptable at S915 (S915=Yes/Acceptable), the next prompt is identified and the process iterates to the next prompt at S920, and the next prompt is played at S901. The process of FIG. 9 as described so far then repeats.

However, if the response to the prompt S901 is determined to be unacceptable at S915 (S915=No/Error), the error is scored at S925 and scores for errors in the process are aggregated at S930. If a threshold has not been reached at S945 (S945=No), the next prompt is identified and the process iterates to the next prompt at S920, and the next prompt is played at S901. The process of FIG. 9 as described so far then repeats.

If a threshold is reached at S945 (S945=Yes), the script from which the prompts are identified is adjusted at S950. The adjustments to the script may be to the wording of one or more prompts, to the speed at which one or more prompts are played, to the language or dialect or accent at which one or more prompts are played. The adjustments to the script may also be to add one or more new prompts as a sub-dialog to an existing script, such as to add instructions for the party to only provide input using a keypad and not as speech. The adjustments to the script may also be to eliminate one or more prompts from the existing script, or to replace one or more prompts from the existing script with one or more new prompts such as a sub-dialog.

As described herein, communications may include calls such as telephone calls. Each individual call may be monitored by a process that notes, categorizes and/or scores each error occurring during interaction. The scores may be aggregated until a threshold is met. Errors can include no input (silence) or no match recognized by speech recognition technology. The system reacts by changing prompts and/or telling the user to change form of input. The changes can include:

changing a set of prompts for a specific interaction sub-dialog, such as a data entry exchange     changing all prompts for the remainder of the communication     soliciting the user to provide a different form of input     instructing the user to terminate the communication session and re-contact the same or a different communication address in the same mode of communication     instructing the user to terminate the communication session and re-contact a specified communication address in a different mode of communication Additionally, as described herein, an interactive system can also monitor error rates for multiple communications and multiple users, so as to evaluate default scripts for systematic errors that can be redressed. As an example, if a certain percentage of users make an error at a particular prompt, the system may automatically change the wording in the particular prompt in the default script, and even in multiple scripts used to provide different communication services, to another prompt wording.

Of course, error information can be collected for an entire system and used to make widespread changes to the system including interactive systems at dispersed locations. For example, the system described herein may sense when the entire system is experiencing problems with users, and change scripts across the system. In addition, or alternatively, the error information can be passed on to system designers, who can then issue a new release of the system with modifications in response to the accumulated error data.

Thus, the teachings described herein can be used to dynamically modify interactive systems both individually and wholesale, and can be used to modify an existing interactive session as well to be incorporated into system design for new scripts. Additionally, the monitoring, the analysis/categorization, the scoring, and/or the modification can be performed by the interactive systems that execute the scripts as in FIGS. 2 and 3, or by a centralized interactive system as in FIG. 6 or another external device or system of devices.

The dynamically flexible system can monitor individual interactions and quickly modify interaction strategies systematically in response to growing problems. Furthermore, one or more individual prompts from a script can be isolated for monitoring and modification when, for example, questions arise as to the effectiveness of the individual prompts but not the entire script. A centralized system such as interactive system 650 in FIG. 6 may monitor and modify isolated individual prompts and the related interactions for multiple interactive systems 610, 620 and 630.

Additionally, similar but not identical prompts in multiple scripts may be monitored and modified without monitoring an entire script. For example, interactions involving prompts related to a particular topic or including a particular word or phrase may be monitored for multiple scripts without monitoring the interactions related to the entire scripts. As described, for example, when particular prompts or groups of related prompts result in too many time-outs, or too many errors of other kinds, the prompts may be replaced, skipped, or otherwise modified during the communications in which the errors occur.

Similarly, as described herein, dynamic modification can be used during testing phases for scripts, so that different versions of prompts or groups of prompts (dialogs or sub-dialogs) can be analyzed to determine which prompts result in the largest set of errors. Errors may include silence, hang-ups, time-outs, incorrect input, or any other detectable anomalies that do not allow the existing script to proceed to the next prompt.

Although dynamic modification of automated communication systems has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

As set forth herein, according to an aspect of the present disclosure, a method is provided for dynamically adjusting a script for an interactive communication during the interactive communication. The method includes monitoring, using a computer with a processor and memory, an interactive communication over a communication network for input during the interactive communication. The method also includes detecting, for the interactive communication, input incompatible with a script for the interactive communication. The method further includes categorizing the incompatible input. The method moreover includes dynamically adjusting the script during the interactive communication into a dynamically updated script in accordance with the categorizing and providing, over the communication network, information to the initiator in accordance with the dynamically updated script.

According to another aspect of the present disclosure, the method includes assigning scores to multiple instances of incompatible input, and aggregating the scores.

According to yet another aspect of the present disclosure, the scores are aggregated until a threshold is reached, and the script is not dynamically adjusted until the threshold is reached.

According to still another aspect of the present disclosure, the dynamically adjusted script is dynamically adjusted with an instruction to the initiator to change a form of input provided by the user.

According to another aspect of the present disclosure, the incompatible input includes silence.

According to another aspect of the present disclosure, the incompatible input includes unrecognized speech.

According to yet another aspect of the present disclosure, the method further includes analyzing input using a speech recognition program.

According to still aspect of the present disclosure, the incompatible speech includes unrecognized speech not recognized by the speech recognition program.

According to another aspect of the present disclosure, the incompatible speech includes speech that does not match speech expected by the speech recognition program.

According to yet another aspect of the present disclosure, the dynamically adjusting includes providing an instruction to not provide speech input.

According to still another aspect of the present disclosure, the dynamically adjusting includes providing an instruction to use touch-tone input.

According to another aspect of the present disclosure, the dynamically adjusting includes switching to a different new prompt in place of a previously-used prompt.

According to yet another aspect of the present disclosure, the different new prompt uses slower speech in place of the previously-used prompt.

According to still another aspect of the present disclosure, the dynamically adjusting includes switching an accepted form of input for a limited portion of a remainder of the interaction communication.

According to another aspect of the present disclosure, the dynamically adjusting includes switching an accepted form of input for a remainder of the interaction communication.

According to yet another aspect of the present disclosure, the method includes aggregating errors from the interactive communication with errors in other interactive communications that start with the same script.

According to still another aspect of the present disclosure, the method includes adjusting a prompt for the script when the aggregated errors across the interactive communications occurring at the prompt reach a threshold.

According to another aspect of the present disclosure, the errors from the interactive communications include terminations of the interactive communications.

According to an aspect of the present disclosure, a tangible computer readable storage medium is encoded with an executable computer program that dynamically adjusts a script for an interactive communication during the interactive communication. When executed by a processor, the computer program causes the processor to perform operations including monitoring, using a computer with a processor that executes the computer program, an interactive communication over a communication network for input during the interactive communication. The operations also include detecting, for the interactive communication, input incompatible with a script for the interactive communication. The operations also include categorizing the incompatible input. The operations also include dynamically adjusting the script during the interactive communication into a dynamically updated script in accordance with the categorizing and providing, over the communication network, information to the initiator in accordance with the dynamically updated script.

According to an aspect of the present disclosure, a system for dynamically adjusting a script for an interactive communication during the interactive communication includes a memory that stores executable instructions and a processor that executes the executable instructions. The system monitors an interactive communication over a communication network for input during the interactive communication. The system detects, for the interactive communication, input incompatible with a script for the interactive communication. The system categorizes the incompatible input. The system dynamically adjusts the script during the interactive communication into a dynamically updated script in accordance with the categorizing and provides, over the communication network, information to the initiator in accordance with the dynamically updated script.

While a computer-readable medium herein may be shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method of dynamically adjusting a script for an interactive communication during the interactive communication, comprising:

monitoring, using a computer with a processor and memory, an interactive communication over a communication network for input during the interactive communication;

detecting, for the interactive communication, input incompatible with an original script for the interactive communication;

categorizing a type of the incompatible input, and dynamically modifying the original script during the interactive communication into a dynamically updated script different from the original script in accordance with the categorizing and providing, over the communication network, information to an initiator of the interactive communication in accordance with the dynamically updated script, wherein a remainder of the interactive communication is conducted in accordance with the dynamically updated script.

2. The method of claim 1, further comprising:

assigning scores to multiple instances of incompatible input, and aggregating the scores.

3. The method of claim 2, wherein the scores are aggregated until a threshold is reached, and wherein the script is not dynamically modified until the threshold is reached.

4. The method of claim 3, wherein the dynamically updated script is dynamically modified with an instruction to the initiator to change a form of input provided by the user.

5. The method of claim 1, wherein the incompatible input comprises silence.

6. The method of claim 1, wherein the incompatible input comprises unrecognized speech.

7. The method of claim 1, further comprising:

analyzing input using a speech recognition program.

8. The method of claim 7, wherein the incompatible speech comprises unrecognized speech not recognized by the speech recognition program.

9. The method of claim 7, wherein the incompatible speech comprises speech that does not match speech expected by the speech recognition program.

10. The method of claim 1, wherein the dynamically modifying comprises providing an instruction to not provide speech input.

11. The method of claim 1, wherein the dynamically modifying comprises providing an instruction to use touch-tone input.

12. The method of claim 1, wherein the dynamically modifying comprises switching to a different new prompt in place of a previously-used prompt.

13. The method of claim 12, wherein the different new prompt uses slower speech in place of the previously-used prompt.

14. The method of claim 1, wherein the dynamically modifying comprises switching an accepted form of input for a limited portion of a remainder of the interaction communication.

15. The method of claim 1, wherein the dynamically modifying comprises switching an accepted form of input for a remainder of the interaction communication.

16. The method of claim 1, further comprising:
aggregating errors from the interactive communication with errors in other interactive communications that start with the same script.

17. The method of claim 16, further comprising:
modifying a prompt for the original script when the aggregated errors across the interactive communications occurring at the prompt reach a threshold.

18. The method of claim 17,
wherein the errors from the interactive communications comprise terminations of the interactive communications.

19. A tangible non-transitory computer readable storage medium encoded with an executable computer program that dynamically adjusts a script for an interactive communication during the interactive communication and that, when executed by a processor, causes the processor to perform operations comprising:
monitoring, using a computer with a processor that executes the computer program, an interactive communication over a communication network for input during the interactive communication;
detecting, for the interactive communication, input incompatible with an original script for the interactive communication;
categorizing a type of the incompatible input, and
dynamically modifying the original script during the interactive communication into a dynamically updated script different from the original script in accordance with the categorizing and providing, over the communication network, information to an initiator of the interactive communication in accordance with the dynamically updated script,
wherein a remainder of the interactive communication is conducted in accordance with the dynamically updated script.

20. A system for dynamically adjusting a script for an interactive communication during the interactive communication, comprising:
a memory that stores executable instructions and;
a processor that executes the executable instructions,
wherein the system monitors an interactive communication over a communication network for input during the interactive communication;
wherein the system detects, for the interactive communication, input incompatible with an original script for the interactive communication;
wherein the system categorizes a type of the incompatible input, and
wherein the system dynamically modifies the original script during the interactive communication into a dynamically updated script different from the original script in accordance with the categorizing and provides, over the communication network, information to an initiator of the interactive communication in accordance with the dynamically updated script,
wherein a remainder of the interactive communication is conducted in accordance with the dynamically updated script.

* * * * *